US012716556B1

(12) United States Patent
Wang

(10) Patent No.: US 12,716,556 B1
(45) Date of Patent: Aug. 25, 2026

(54) CONVENIENTLY ASSEMBLED (LIGHT EMITTING DIODE) LED LAMP

(71) Applicant: Dongguan Guanyi Light-decoration CO., LTD, Dongguan City (CN)

(72) Inventor: Shifang Wang, Dongguan City (CN)

(73) Assignee: Dongguan Guanyi Light-decoration CO., LTD, Dongguan City (CN)

( * ) Notice: Subject to any disclaimer, the term of this patent is extended or adjusted under 35 U.S.C. 154(b) by 0 days.

(21) Appl. No.: 19/298,994

(22) Filed: Aug. 13, 2025

(30) Foreign Application Priority Data

Aug. 4, 2025 (CN) ........................ 202521638083.7

(51) Int. Cl.
*F21K 9/238* (2016.01)
*F21V 19/00* (2006.01)

(52) U.S. Cl.
CPC ............ *F21K 9/238* (2016.08); *F21V 19/003* (2013.01)

(58) Field of Classification Search
CPC ...... F21K 9/238; F21V 19/003; F21V 23/001; F21V 23/002; F21V 23/06; F21S 4/10
See application file for complete search history.

(56) References Cited

U.S. PATENT DOCUMENTS

| | | | | |
|---|---|---|---|---|
| 11,384,907 | B1 * | 7/2022 | Zou | F21V 21/002 |
| 11,920,742 | B1 * | 3/2024 | Zou | F21K 9/232 |
| 12,352,414 | B1 * | 7/2025 | Yan | F21V 17/16 |
| 2017/0159922 | A1 * | 6/2017 | Chen | F21V 23/06 |

* cited by examiner

*Primary Examiner* — Erin Kryukova
(74) *Attorney, Agent, or Firm* — AVEK IP, LLC

(57) ABSTRACT

Some embodiments of the disclosure disclose conveniently assembled light emitting diode (LED) lamps. In some examples, the conveniently assembled LED lamp includes a lamp holder, a bulb housing, a light source assembly, and an electrical connection assembly, where an opening of the lamp holder is elastic. Some examples of the present disclosure may have following advantages: 1, the electrical connection assembly pierces into the conductive wire to form an electric ire connection and the light source assembly is inserted and the bulb housing is mounted to complete assembly, such that the assembly mode is simple and fast; and 2, when the bulb housing is connected to the lamp holder, the lamp holder is in close fit with the bulb housing, such that the interior of the lamp holder is sealed to prevent moisture from entering the lamp holder, and the waterproof effect is good.

9 Claims, 11 Drawing Sheets

CONVENIENTLY ASSEMBLED (LIGHT EMITTING DIODE) LED LAMP

BACKGROUND

1. Technical Field

The present disclosure relates to the technical field of lamps, in particular to, a conveniently assembled light emitting diode (LED) lamp.

2. Description of Related Art

With the increasing development of the lighting technology, thanks to advantages of energy conservation and environmental protection, long service life, high lighting effect, and the like, LED lamps have been widely used in the fields of household lighting, commercial lighting and landscape lighting. The requirements on lamps are no longer limited to the basic lighting function but people pay more attention to decoration and ambiance-creating capability. For example, LED light strings often used in scenarios such as festival decorations and landscape lighting are mounted at positions such as Christmas trees, wall bodies, fences or ceilings to create diversified visual effects.

However, conventional LED lamps are complex in structure, and screws are needed to fix light source assemblies during assembly. An existing LED lamp is improved based on the conventional lamp. For example, the Chinese patent Publication No. CN216743944U discloses an LED lamp. Although the cost is reduced and the internal structure is simplified, the LED lamp is lack of assembly convenience and still high in production cost. Moreover, to facilitate detachment, the bulb and the lamp holder are unstably connected, resulting in insufficient waterproof performance.

SUMMARY

Some embodiments of the disclosure provide an conveniently assembled light emitting diode (LED) lamp provided by the present disclosure includes a lamp holder, a bulb housing, a light source assembly, and an electric connection assembly, where the lamp holder is internally provided with an accommodating cavity for accommodating the electric connection assembly.

The electric connection assembly includes:

an intermediate body, located in the accommodating cavity, provided with a first wire groove for a conductive wire to pass through, and further provided with a first locking position, a second locking position, and a connection port;

a first connection terminal, mounted at the first locking position, where an upper end of the first connection terminal is provided with a first sharp protrusion, the first sharp protrusion pierces into a conductive wire in the first wire groove to form an electric connection, and a lower end of the first connection terminal extends into the connection port; and a second connection terminal, mounted at the second locking position, where an upper end of the second connection terminal is provided with a second sharp protrusion, the second sharp protrusion pierces into another conductive wire in the first wire groove to form an electric connection, and a lower end of the second connection terminal extends into the connection port;

the light source assembly is at least provided with a light-emitting light strip and an electric connection plate electrically connected to the light-emitting light strip, where the electric connection plate is fixed to the connection port by plug-in connection and forms electric connections with the first connection terminal and the second connection terminal; and an opening of the lamp holder is elastic, and when the bulb housing is in close connection to the lamp holder, the interior of the lamp holder is sealed to prevent water from entering the lamp holder.

Further, an accommodating groove for mounting the intermediate body is formed in a bottom end of the accommodating cavity, a positioning column is disposed outside the intermediate body, and a first positioning groove mating with the positioning column is formed in a side wall of the accommodating groove.

Optionally, a plurality of positioning columns are equally spaced apart around an outer wall of the intermediate body.

Further, the intermediate body is provided with an annular protrusion, and the connection port extends outward and exceeds an outer end surface of the annular protrusion.

Further, an annular groove is formed in the side wall of the accommodating cavity, and the intermediate body configured to be locked in the annular groove is fixed in the accommodating cavity.

Further, the accommodating cavity is provided with a second wire groove for fixing the conductive wire, such that the conductive wire penetrates into the lamp holder from outside.

Further, the electric connection assembly is provided with a sealing cover, the sealing cover is provided with a clamping tongue configure to snap-fit to the intermediate, the sealing cover is further provided with a pressing strip, and the pressing strip extends into the first wire groove to fix the conductive wire in the first wire groove.

Further, a first connection part is disposed on the side wall of the accommodating cavity, and the bulb housing is provided with a second connection part in limited connection to the first connection part.

Further, an end of each of the first connection terminal and the second connection terminal extending into the connection port is provided with a U-shaped bayonet, and the electric connection plate is electrically connected to the U-shaped bayonet.

Further, an end of the first connection terminal extending into the connection port is provided with an elastic contact part and is located on an inner side wall a of the connection port; and an end of the second connection terminal extending into the connection port is provided with an elastic contact part and is located on an inner side wall b opposite to the inner side wall a of the connection port.

Further, a protruding electronic component is disposed on a plane of the electric connection plate, and the protruding electronic component mates with the connection port.

Further, the electric connection plate is provided with a first copper foil layer and a second copper foil layer respectively connected to the light-emitting light strip, the first copper foil layer is connected to the first connection terminal to form one circuit, and the second copper foil layer is connected to the second connection terminal to form another circuit.

The present disclosure has the following beneficial effects: compared with the prior art, the conveniently assembled LED lamp provided by the present disclosure includes the lamp holder, the bulb housing, the light source assembly, and the electrical connection assembly, where the lamp holder is internally provided with the accommodating cavity for accommodating the electric connection assembly;

the electric connection assembly includes the intermediate body, the first connection terminal and the first sharp protrusion, and the second connection terminal and the second sharp protrusion; the light source assembly is at least provided with the light-emitting light strip and the electric connection plate electrically connected to the light-emitting light strip, and the electric connection plate is fixed to the connection port by plug-in connection and forms electric connections with the first connection terminal and the second connection terminal; and the opening of the lamp holder is elastic.

REFERENCE SIGNS

Figure 1:
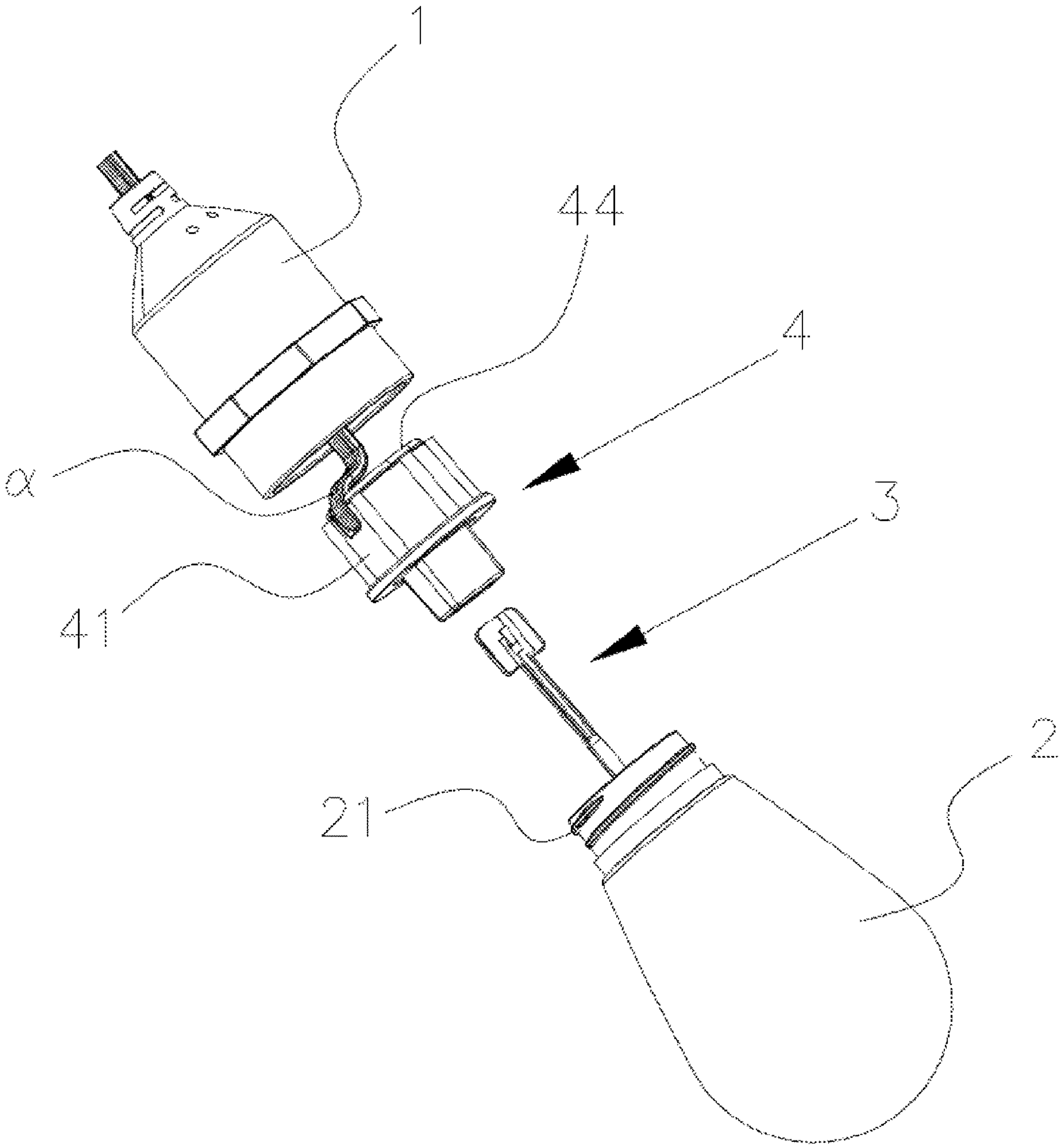
FIG. 1 is an exploded view of a structure according to an embodiment of the disclosure.
Figure 2:
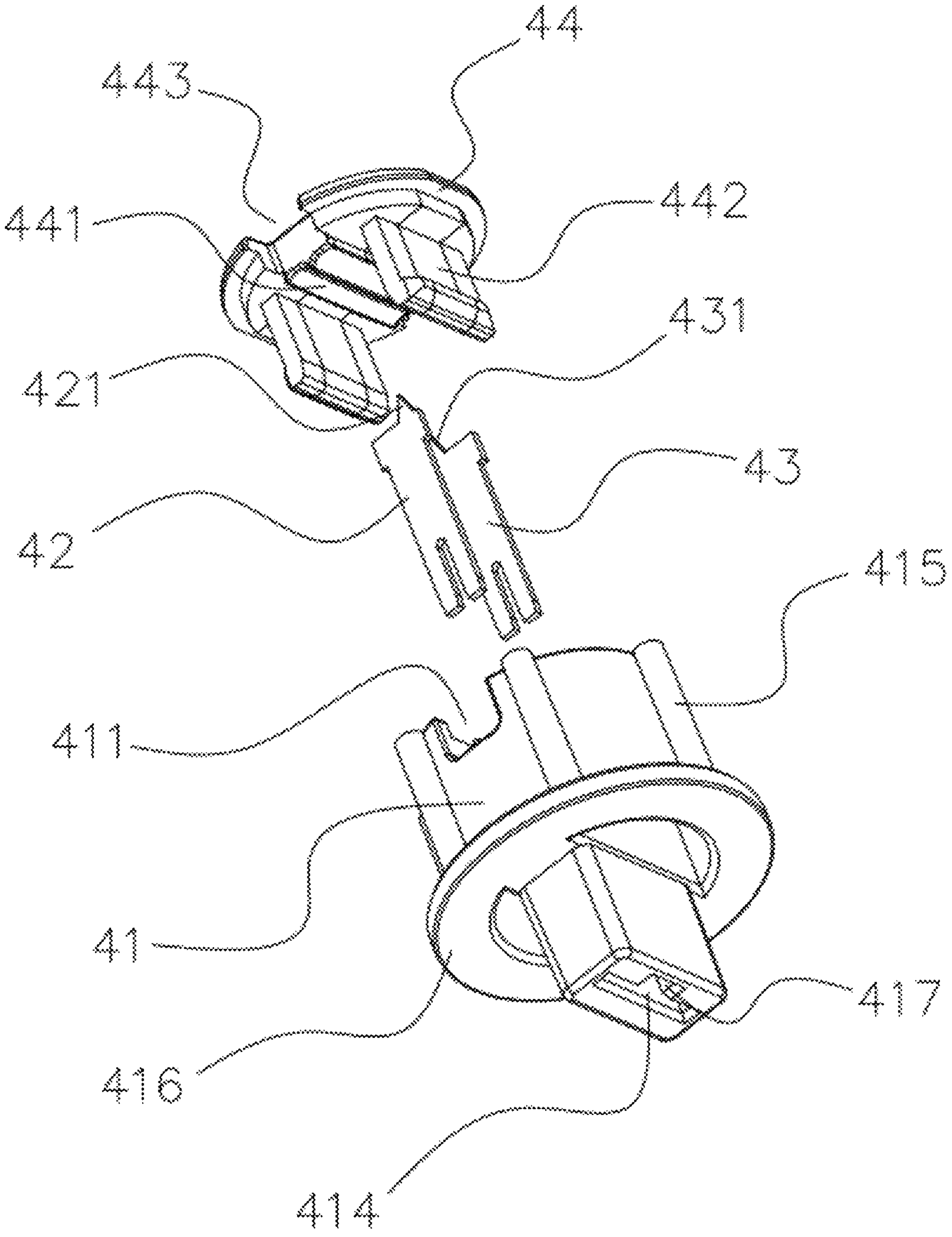
FIG. 2 is an exploded view of a structure of an electric connection assembly according to an embodiment of the disclosure.
Figure 3:
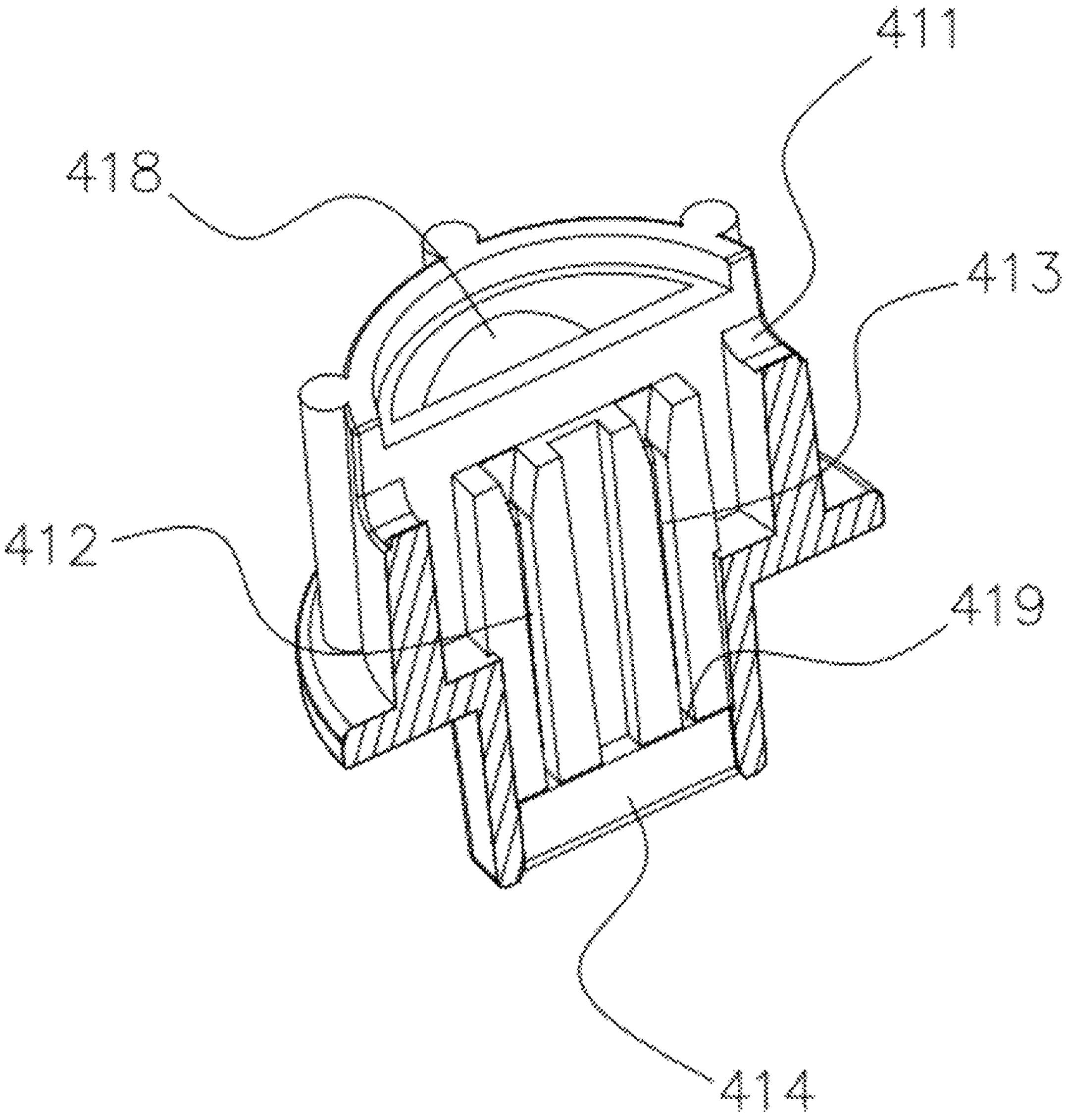
FIG. 3 is a sectional view of a structure of an intermediate body according to an embodiment of the disclosure.
Figure 4:
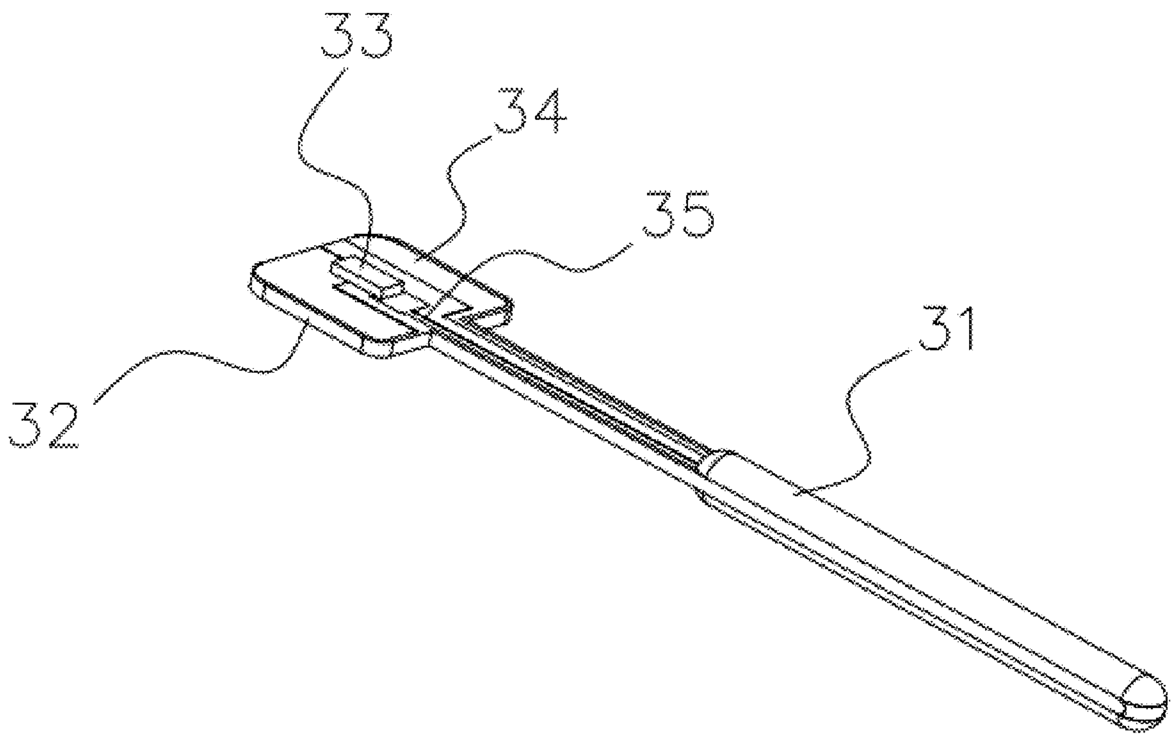
FIG. 4 is a schematic structural diagram of a light source assembly according to an embodiment of the disclosure.

1, lamp holder; 11, accommodating cavity; 12, accommodating groove; 13, first positioning groove; 14, annular groove; 15, second wire groove; 151, transverse wire groove segment; 152, detouring wire groove segment; 16, first connection part; 17, inner convex ring; 18, protruding block; 2, bulb housing; 21, second connection part; 3, light source assembly; 31, light-emitting light strip; 32, electric connection plate; 33, protruding electronic component; 34, first copper foil layer; 35, second copper foil layer; 36, pin; 4, electric connection assembly; 41, intermediate body; 411, first wire groove; 412, first locking position; 413, second locking position; 414, connection port; 415, positioning column; 416, annular protrusion; 417, second positioning groove; 418, third locking position; 419, step part; 42, first connection terminal; 421, first sharp protrusion; 422, U-shaped bayonet; 423, elastic contact part; 424, extended panel; 43, second connection terminal; 431, second sharp protrusion; 44, sealing cover; 441, pressing strip; 442, clamping tongue; 443, recess; 45, inner side wall a; and 46, inner side wall b.

DETAILED DESCRIPTION

The present disclosure will be described in detail below in conjunction with FIGS. 1-8.

An conveniently assembled light emitting diode (LED) lamp provided by the present disclosure may include a lamp holder 1, a bulb housing 2, a light source assembly 3, and an electric connection assembly 4, where the lamp holder 1 is internally provided with an accommodating cavity 11 for accommodating the electric connection assembly 4; the accommodating cavity 11 is provided with an opening, the bulb housing 2 is mounted in the opening to form a connection with the lamp holder 1, and the accommodating cavity 11 intercommunicates with the bulb housing 2, such that the light source assembly 3 connected to the electric connection assembly 4 may extend into the bulb housing 2 to obtain a better light projection effect.

The electric connection assembly 4 may include: an intermediate body 41, located in the accommodating cavity 11, provided with a first wire groove 411 for a conductive wire to pass through, and further provided with a first locking position 412, a second locking position 413, and a connection port 414.

To obtain a better fixing effect of the conductive wire in the first wire groove 411 to form modularization in the production process, the electric connection assembly 4 is provided with a sealing cover 44, the sealing cover 44 is provided with a clamping tongue 442 configured to snap-fit to the intermediate 41, the sealing cover 44 is further provided with a pressing strip 441, and the pressing strip 441 extends into the first wire groove 411 to fix the conductive wire in the first wire groove 411. The end cover is snap-fitted with the intermediate body 41, such that the pressing strip 441 and the first wire groove 411 form a limit, and the conductive wire and the electric connection assembly 4 are relatively fixed. The connection stability is improved, and the piercing effect between the conductive wire and the first connection terminal 42 and the second connection terminal 43 may also be improved.

Specifically, the first connection terminal 42 is mounted at a first locking position 412, an upper end of the first connection terminal 42 is provided with a first sharp protrusion 421, the first sharp protrusion 421 pierces into a conductive wire in the first wire groove 411 to form an electric connection, and a lower end of the first connection terminal 42 extends into the connection port 414. The first locking position 412 intercommunicates with the connection port 414, and an end of the first locking position 412 close to the connection port 414 is provided with a step part 419 to support the first connection terminal 42, such that the first sharp protrusion 421 pierces into the conductive wire.

The second connection terminal 43 is mounted at a second locking position 413, an upper end of the second connection terminal 43 is provided with a second sharp protrusion 431, the second sharp protrusion 431 pierces into another conductive wire in the first wire groove 411 to form an electric connection, and a lower end of the second connection terminal 43 extends into the connection port 414. The second locking position 413 intercommunicates with the connection port 414, and an end of the second locking position 413 close to the connection port 414 is provided with a step part 419 to support the second connection terminal 43, such that the second sharp protrusion 431 pierces into the conductive wire.

The first connection terminal 42 and the second connection terminal 43 are centrally symmetric. The first sharp protrusion 421 and the second sharp protrusion 431 both deviate the center position of the first wire groove 411. During assembly, both the first sharp protrusion 421 and the second sharp protrusion 431 may pierce into the conductive wires at corresponding positions (pierce outer insulating layers of the conductive wires mainly), such that the electric connection assembly 4 is in wire connection to two different conductive wires to form two electrodes.

The light source assembly 3 is at least provided with a light-emitting light strip 31 and an electric connection plate 32 electrically connected to the light-emitting light strip 31, wherein the electric connection plate 32 is fixed to the connection port 414 by plug-in connection and forms electric connections with the first connection terminal 42 and the second connection terminal 43. The light source assembly 3 is detachably connected to the electric connection assembly 4. The light source assembly 3 may be mounted and detached in a plugging and unplugging manner. The mode of assembling the light source assembly 3 is simple, and light source assemblies 3 with different lighting effects may be replaced in a plugging and unplugging manner, such that the lighting atmosphere of the LED lamp is improved.

Figure 7:
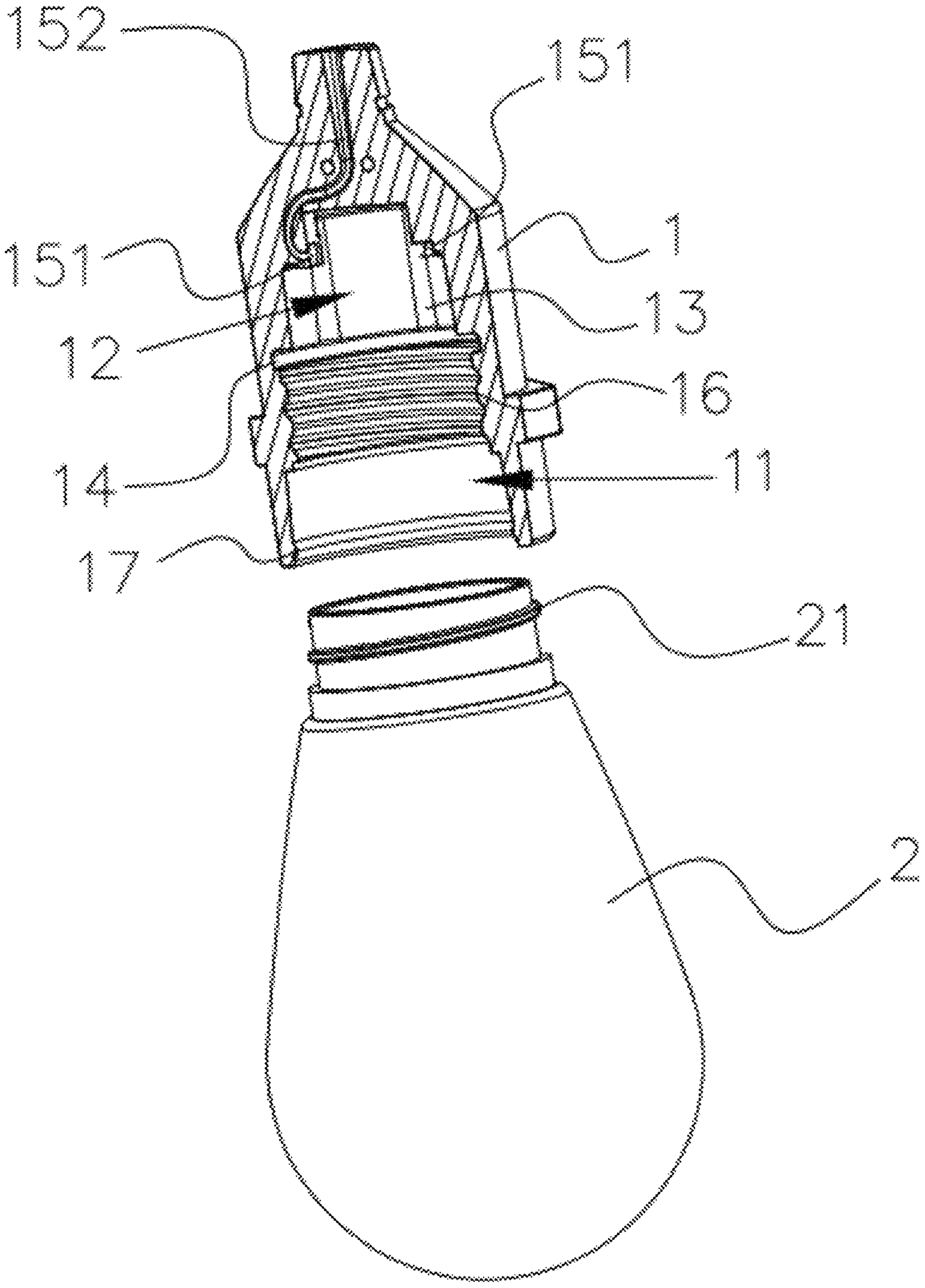
FIG. 7 is a schematic structural diagram of a separate incoming wire of the lamp holder according to an embodiment of the disclosure.

A first connection part 16 is disposed on the side wall of the accommodating cavity 11, and the bulb housing 2 is provided with a second connection part 21 in limited connection to the first connection part 16. Optionally, the first connection part 16 and the second connection part 21 may be in threaded shapes. Referring to FIG. 7, in the threaded shapes, a connection end of the bulb housing 2 is inserted into the accommodating cavity 11 and the bulb housing 2 is twisted, such that the bulb housing 2 is fixedly connected to the lamp holder 1. As another alternative, referring to FIG. 8, the first connection part 16 and the second connection part 21 may be in a protruding annular shape. The first connection part 16 is elastic. In this shape, the connection end of the bulb housing 2 is directly inserted into the accommodating cavity 11, such that the second connection part 21 extrudes into the inner end of the first connection part 16. The first connection part 16 locks the second connection part 21, such that the bulb housing 2 is fixedly connected to the lamp holder 1, and the bulb housing 2 may be mounted quickly.

An accommodating groove 12 for mounting the intermediate body 41 is formed in a bottom end of the accommodating cavity 11, a positioning column 415 is disposed outside the intermediate body 41, and a first positioning groove 13 mating with the positioning column 415 is formed in a side wall of the accommodating groove 12. In this solution, in the step of assembling the electric connection assembly 4 in the lamp holder 1, first, the sealing cover 44 is placed at the bottom of the accommodating groove 12, then the conductive wire is placed in front of the pressing strip 441 and parallel to the pressing strip 441, and finally, the first wire groove 411, aligned with the intermediate body, is placed in the accommodating groove 12, such that the sealing cover 44 is snap-fitted to the intermediate body. In this case, pressed by the pressing strip 441, the first sharp protrusion 421 and the second sharp protrusion 431 pierce into the conductive wire, and the electric connection assembly 4 is assembled in the lamp holder 1 and is connected to a circuit. The intermediate body 41 is further provided with a locking position 418 snap-fitted to the clamping tongue 442. When the intermediate body 41 is assembled, the positioning column 415 and the first positioning groove 13 are positioned, which, on the one hand, enables the first wire groove 411 to be aligned with the conductive wire and the clamping tongue 442 of the sealing cover 44 to be aligned with the third locking position 418 of the intermediate body 41, and on the other hand, avoids misaligned assembly due to rotation of the intermediate body 41 in the assembly process, thereby improving the assembly stability and convenience and accelerating the assembly speed.

A plurality of positioning columns 415 are equally spaced apart around an outer wall of the intermediate body 41. In this solution, the first wire groove 411 and the pressing strip 441 are of linear structures. The first connection terminal 42 and the second connection terminal 43 are centrally symmetric. Therefore, the intermediate body 41 rotates at 180°, such that the first wire groove 411 with front and back ends interchanged may also be assembled in the accommodating groove 12. The plurality of positioning columns 415 are disposed and the number of the positioning columns is an even number. The spacing between adjacent positioning columns 415 is consistent, such that the intermediate body 41 is aligned and assembled.

The accommodating cavity 11 is provided with a second wire groove 15 for fixing the conductive wire, such that the conductive wire penetrates into the lamp holder 1 from outside. The structure of the lamp holder 1 for mounting the conductive wire may include a separate incoming wire structure and an incoming and outgoing wire structure. The structure of the second wire groove 15 of the separate incoming wire structure is shown in FIG. 7. The second wire groove 15 may include a transverse wire groove segment 151 and a detouring wire groove segment 152. The detouring wire groove segment 152 is led out upward from one end of the transverse wire groove segment 151 and extends to the outside of the lamp holder 1. Finally, the detouring wire groove segment and the transverse wire groove segment 151 are vertically arranged. Specifically, the conductive wire detours through the detouring wire groove segment 152 and then enters the transverse wire groove segment 151, such that the conductive wire in the transverse wire groove segment 151 is configured to pass through the first wire groove 411, and the tail end of the conductive wire is also hidden in an end of the transverse wire groove segment 151. When the electric connection assembly 4 is assembled, the second wire groove 15 is aligned with the first wire groove 411 to fix the conductive wire. In this structure, the second wire groove 15 may be led to the top end of the lamp holder 1, and the conductive wire enters in the lamp holder 1 from the top of the lamp holder 1 to form a pendant lamp shape.

Figure 8:
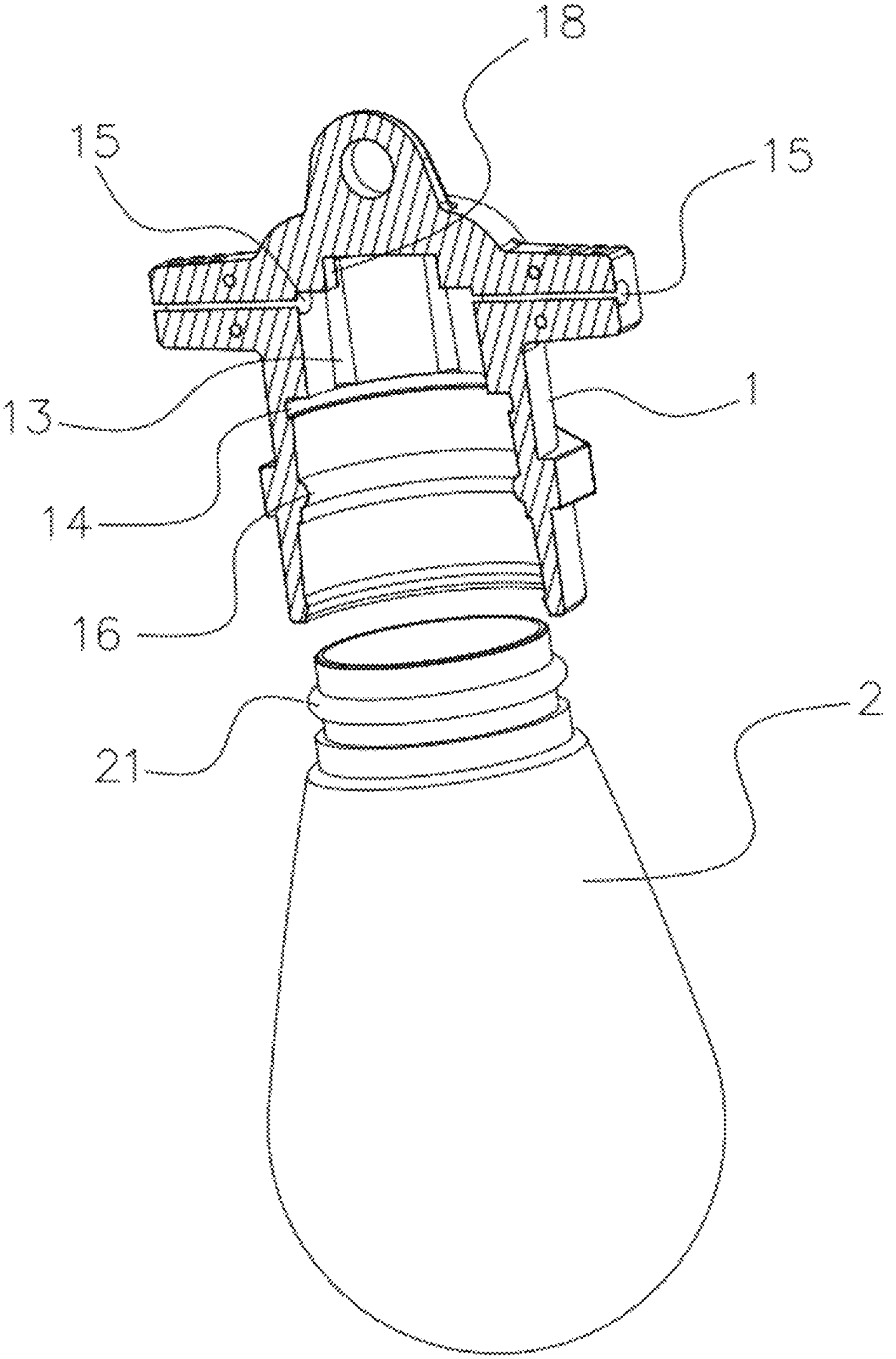
FIG. 8 is a schematic structural diagram of incoming and outgoing wires of the lamp holder according to an embodiment of the disclosure.
Figure 9:
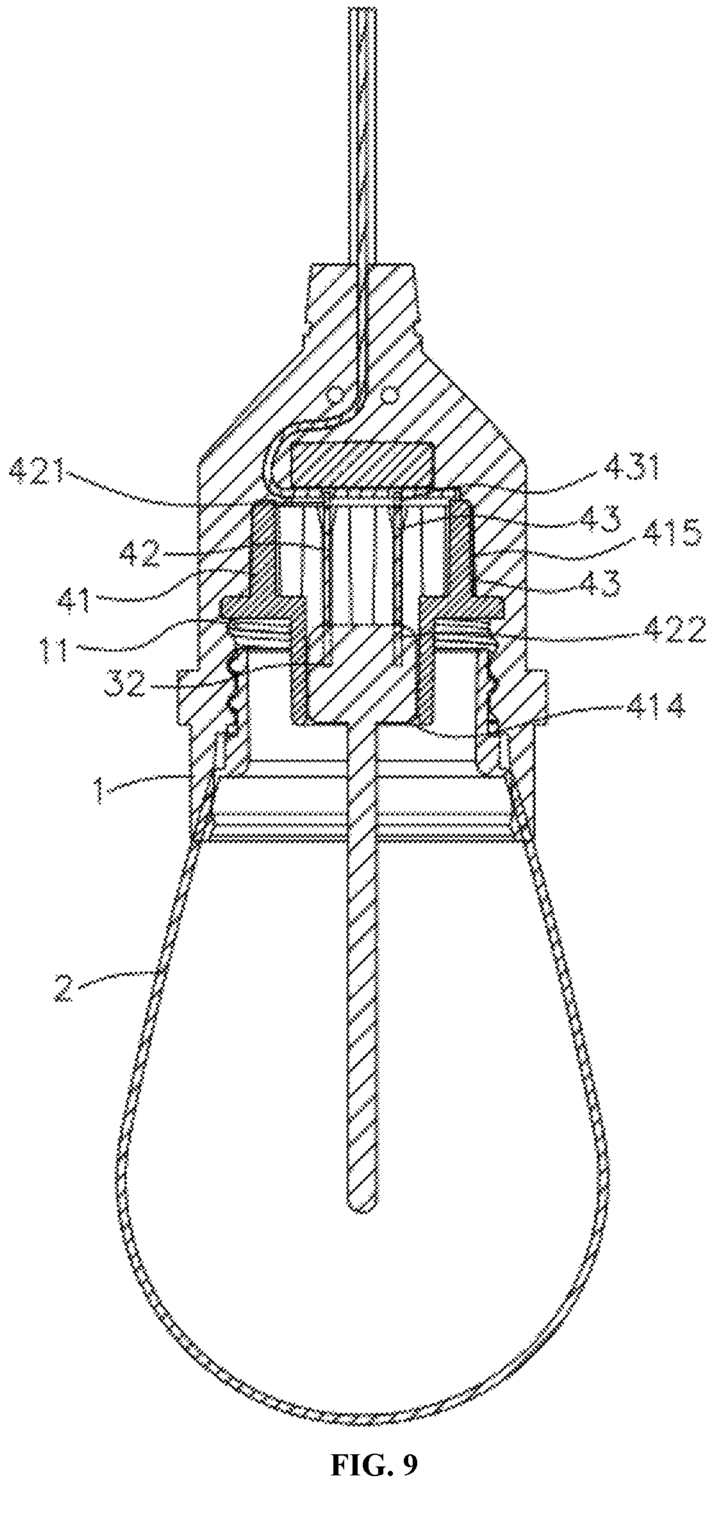
FIG.9 is a schematic structural diagram of the sectional view of the present disclosure.
Figure 10:
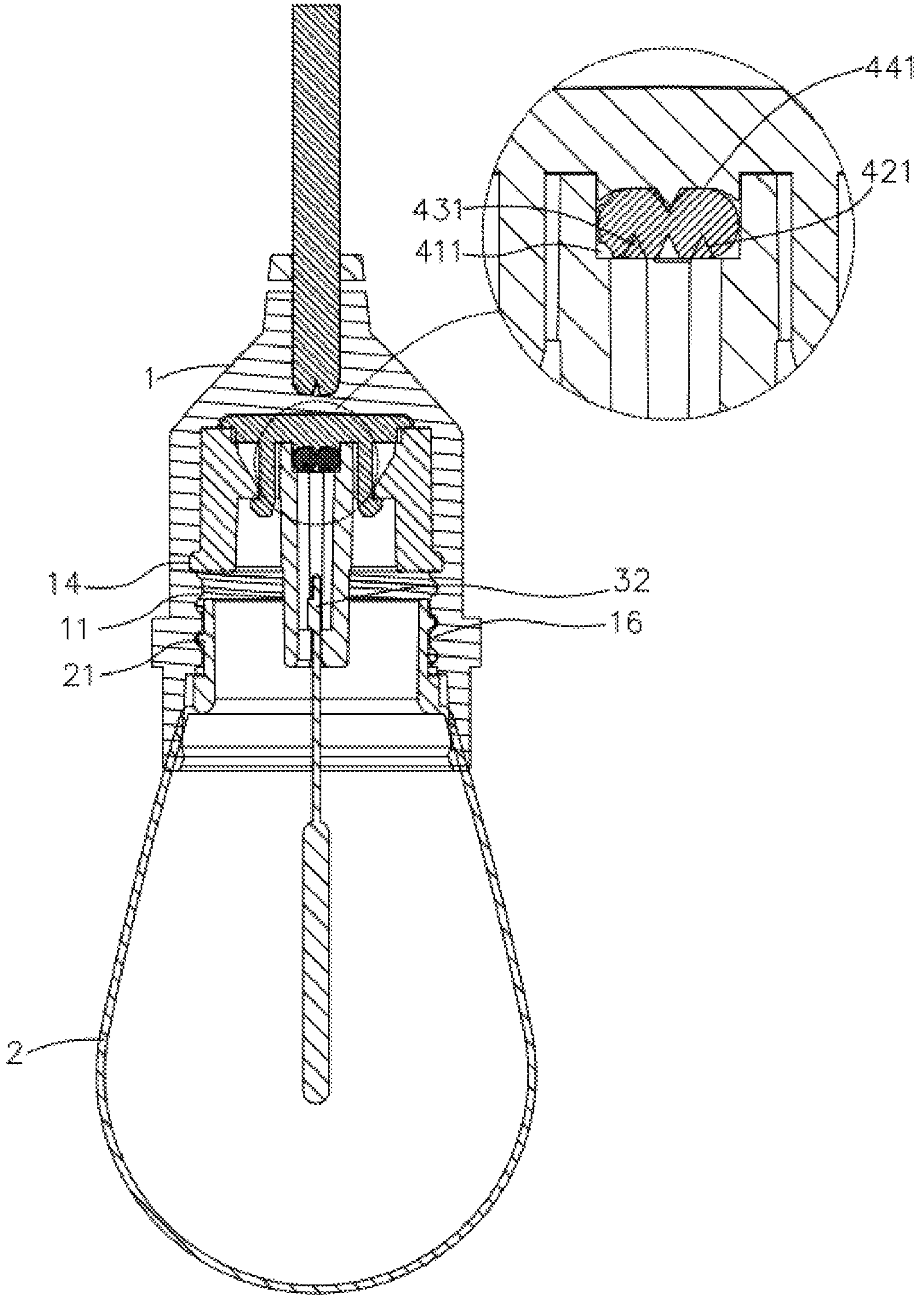
FIG. 10 is a schematic structural diagram of the sectional view of the present disclosure in another direction.
Figure 11:
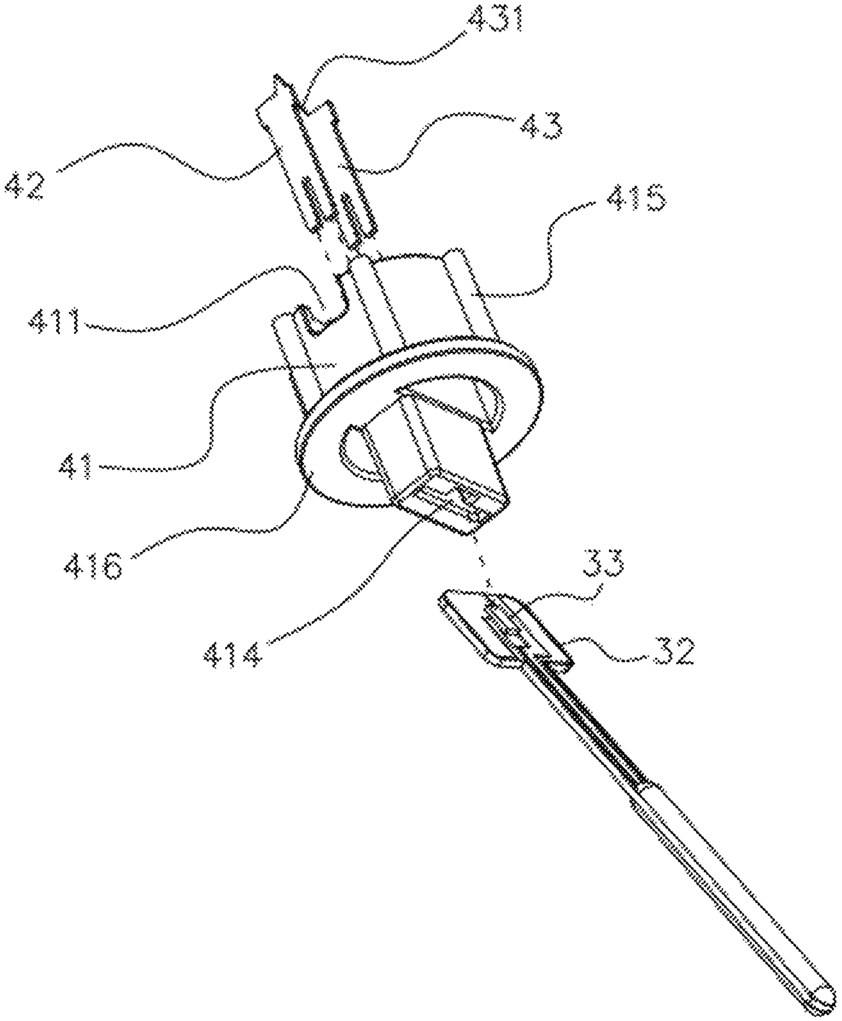
FIG. 11 is a schematic structural diagram of the fit structure of the light source assembly and the electric connection assembly.

The structure of the second wire groove 15 of another incoming and outgoing wire structure is shown in FIG. 8. The second wire groove 15 is formed in each side of the accommodating groove 12, the two second wire grooves 15 both extend toward the outside of the lamp holder 1, and the conductive wire enters the lamp holder 1 through one second wire groove 15 and extends out from the lamp holder 1 from the other second wire groove 15. When the electric connection assembly 4 is assembled, the second wire grooves 15 are aligned with the first wire groove 411 to fix the conductive wire. A plurality of lamp holders 1 in this structure may be disposed continuously on the same conductive wire, such that the lamps are combined to form a light string.

A protruding block 18 is disposed at the bottom of the accommodating groove 12, and the sealing cover 44 is provided with a recess 443 mating with the protruding block 18. The recess 443 is aligned with the protruding block 18 and the sealing cover 44 is placed in the accommodating groove 12, such that the pressing strip 441 is aligned with the second wire groove 15. During subsequent assembly of the intermediate body 41, the first wire groove 411 may be connected to the conductive wire stably, thereby improving the assembly precision.

The intermediate body 41 is provided with an annular protrusion 416, and the connection port 414 extends outward and exceeds an outer end surface of the annular protrusion 416. During assembly, after the bulb housing 2 and the lamp holder 1 are connected and fixed, the opening end of the bulb housing 2 may lean against the annular protrusion 416 to fix the electric connection assembly 4 in the lamp holder 1.

The LED lamp may be assembled using an automatic assembly device. In the assembly steps, the sealing cover 44 is placed in the accommodating groove 12 and the conductive wire is placed in the second wire groove 15. The lamp holder 1, the conductive wire, and the sealing cover 44 are assembled to form a combined part which is placed in an assembly station. The first connection terminal 42 and the second connection terminal 43 are placed in the intermediate body 41 to form another combined part. The intermediate body 41 is assembled in the lamp holder 1 using devices such as a manipulator. The first sharp protrusion 421 of the first connection terminal 42 and the second sharp protrusion 431 of the second connection terminal 43 pierce into the conductive wire to complete the assembly of the electric connection assembly 4 while the intermediate body 41 is snap-fitted and fixed to the sealing cover 44. Then the light source assembly 3 and the bulb housing 2 are mounted in sequence using devices such as the manipulator to complete the assembly of the LED lamp. The production and assembly efficiencies may be improved, and the human resource cost may be reduced. The LED lamp may be firmly assembly without using fasteners such as screws and welding, such that the manufacturing cost is low, and the assembly speed is high.

An annular groove 14 is formed in the side wall of the accommodating cavity 11, and the intermediate body 41 configured to be locked in the annular groove 14 is fixed in the accommodating cavity 11. The electric connection assembly 4 is fixed in a manner that the bulb housing 2 leans against the annular protrusion 416. When the LED lamp is assembled using the assembly device, the intermediate body 41 may only be assembled in the lamp holder 1 from top to bottom and the opening end of the bulb housing 2 needs to be lengthened, which causes an extra cost. In view of this, in this solution, the electric connection assembly 4 is assembled in the lamp holder 1, and the annular protrusion 416 may be embedded into the annular groove 14, such that the electric connection assembly 4 is fixed in the lamp holder 1 without being fixed by the bulb housing 2 in an auxiliary manner. This fixing mode enables the intermediate body 41 to be assembled and fixed in the lamp holder 1 from bottom to top, and then other components are assembled. This assembly mode has a variety of choices and facilitates production.

An opening of the lamp holder 1 is elastic, and when the bulb housing 2 is in close connection to the lamp holder 1, the interior of the lamp holder 1 is sealed to prevent water from entering the lamp holder. The first connection part 16 and the second connection part 21 are connected with each other, such that the bulb housing 2 is fixed on the lamp holder 1. The opening of the lamp holder 1 is in close fit with the surface of the bulb housing 2, such that the lamp holder 1 is sealed to prevent moisture from entering the lamp holder 1, with a good waterproof effect.

A triangular inner convex ring 17 is disposed on the inner side of the opening of the lamp holder 1, such that the inner convex ring fits the surface of the bulb housing 2 with a radian or angle, and the inner convex ring 17 may cling to the surface of the bulb housing 2, such that the waterproof effect of the connection between the lamp holder 1 and the bulb is improved.

Further, an end of each of the first connection terminal 42 and the second connection terminal 43 extending into the connection port 414 is provided with a U-shaped bayonet 422, and the electric connection plate 32 is electrically connected to the U-shaped bayonet 422. Both sides of the U-shaped bayonet 422 are provided with edge chamfers, such that the electric connection plate 32 is inserted into the U-shaped bayonet 422. The U-shaped bayonet 422 is provided with two extended panels 424. The extended panels 424 may increase the contact area between the U-shaped bayonet 422 and the electric connection plate 32 and improve the stability of the connection between the light source assembly 3 and the electric connection assembly 4. Certainly, to make the extended panels have a certain elastic clamping effect together with the electric connection plate 32, one or two opposite extended panels 424 are disposed at a certain inclination angle.

In this technical solution, the electric connection plate 32 may be optionally provided with a first copper foil layer 34 and a second copper foil layer 35 respectively connected to the light-emitting light strip 31, the first copper foil layer 34 is connected to the first connection terminal 42 to form one circuit, and the second copper foil layer 35 is connected to the second connection terminal 43 to form another circuit. The electric connection plate 32 is small in size, and the first copper foil layer 34 and the second copper foil layer 35 both are electrolytic copper foils, such that the manufacturing cost is low.

A protruding electronic component 33 is disposed on a plane of the electric connection plate 32, and the protruding electronic component 33 mates with the connection port 414. The connection port 414 is provided with a second positioning groove 417 for the protruding electronic component 33 to pass through, and the protruding electronic component 33 and the second positioning groove 417 mate to form a foolproof structure, such that the light source assembly 3 is correctly plugged and assembled. The protruding electronic component 33 is a power resistor and is connected to the first copper foil layer 34 to control the resistor accessing the power supply.

Figure 5:
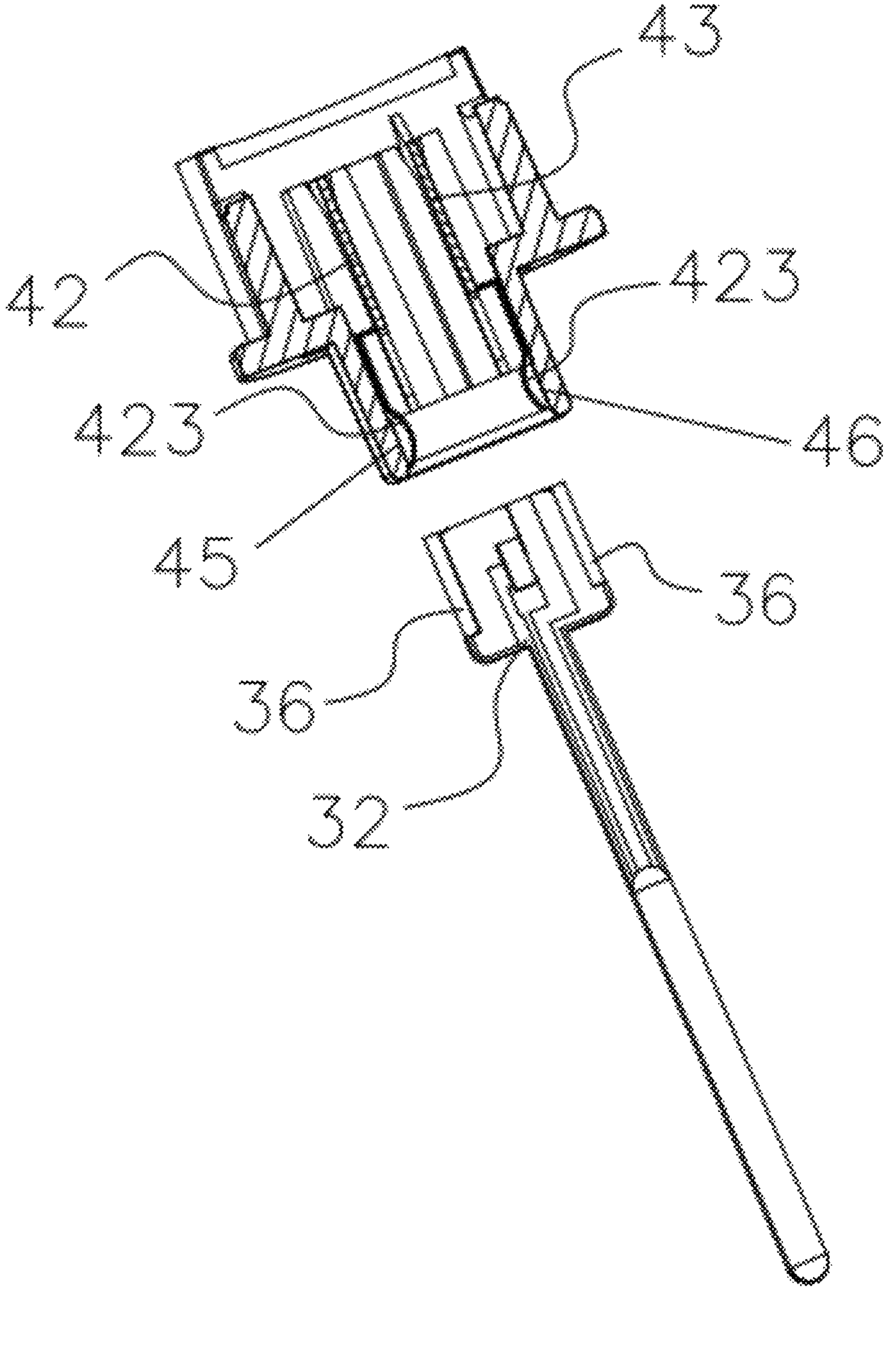
FIG. 5 is a schematic structural diagram of a pin plug-in structure of a light source assembly and corresponding first connection terminal and second connection terminal according to an embodiment of the disclosure.
Figure 6:
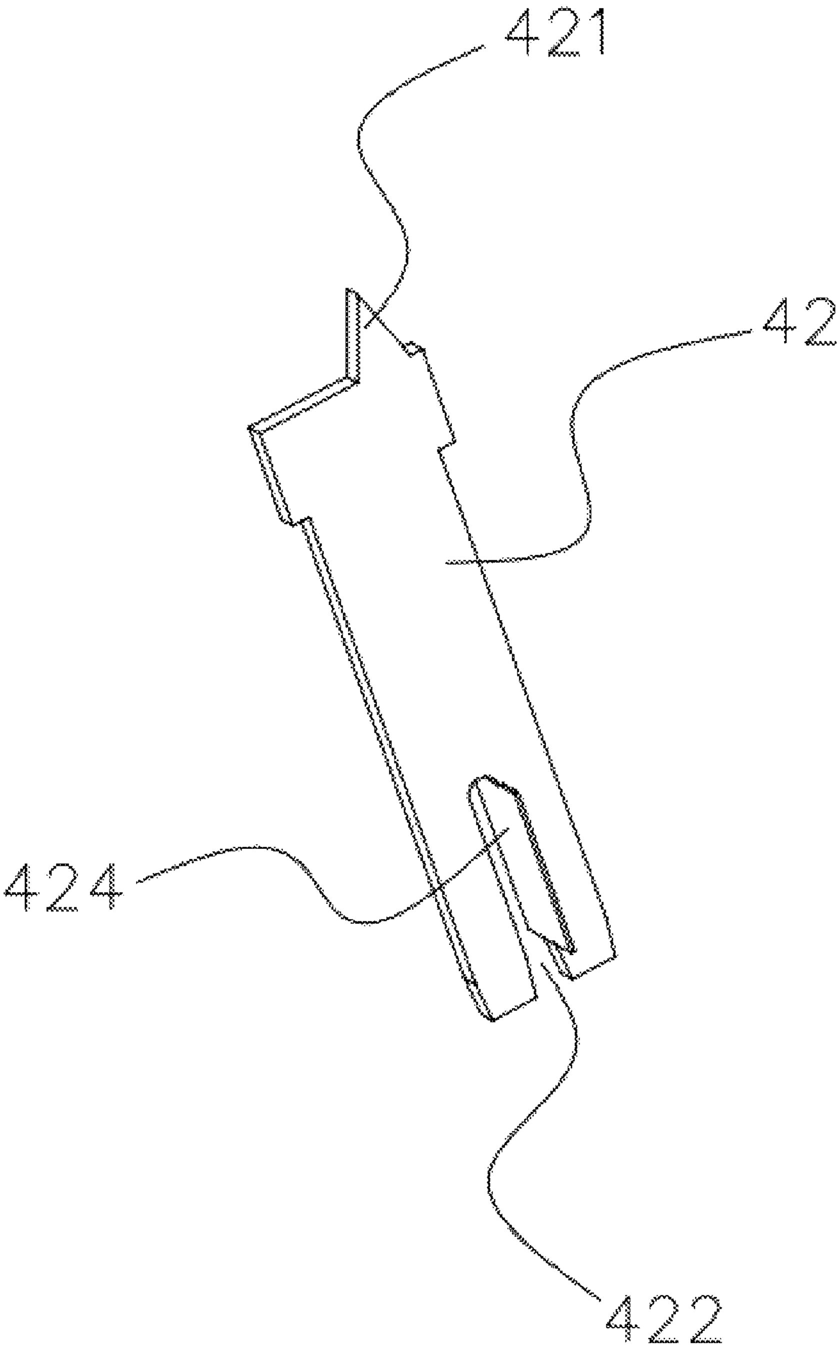
FIG. 6 is a schematic structural diagram of the first connection terminal according to an embodiment of the disclosure.

An end of the first connection terminal 42 extending into the connection port 414 is provided with an elastic contact part 423 and is located on an inner side wall a 45 of the connection port 414; and an end of the second connection terminal 43 extending into the connection port 414 is provided with an elastic contact part 423 and is located on an inner side wall b 46 opposite to the inner side wall a 45 of the connection port 414. Referring to FIG. 5, the light source assembly 3 may further be provided with two pins 36 in wire connection to the first connection terminal 42 and the second connection terminal 43. When the power supply assembly is connected to the electric connection assembly 4, the pins 36 are inserted into the connection port 414 and lean against the elastic contact part 423. The elastic contact part 423 is elastic and may withstand the pins 36 continuously to fix the light source assembly 3, such that the light source assembly 3 is prevented from falling off accidentally.

Various embodiments may have one or more of the following effects. In some embodiments, the disclosure may help to overcome deficiencies in the prior art by providing a conveniently assembled light emitting diode (LED) lamp, which may have the advantage of being easy to assemble and low in cost. In other embodiments, the electrical connection assembly may be pushed into the lamp holder, such that a connection terminal pierces a conductive wire to form an electric wire connection, the light source assembly may be inserted and the bulb housing may be mounted to complete assembly, and the assembly mode may be simple and fast. In further embodiments, when the bulb housing may be connected to the lamp holder, the opening of the lamp holder may be in close fit with the surface of the bulb housing, such that the interior of the lamp holder may be sealed to prevent moisture from entering the lamp holder, and the waterproof effect may be good.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A light emitting diode (LED) lamp, comprising a lamp holder (1), a bulb housing (2), a light source assembly (3), and an electric connection assembly (4), wherein:

the lamp holder (1) is internally provided with an accommodating cavity (11) for accommodating the electric connection assembly (4);

the electric connection assembly (4) comprises:

an intermediate body (41), located in the accommodating cavity (11), provided with a first wire groove (411) for a conductive wire to pass through, and further provided with a first locking position (412), a second locking position (413), and a connection port (414);

a first connection terminal (42), mounted at the first locking position (412), wherein an upper end of the first connection terminal (42) is provided with a first sharp protrusion (421), the first sharp protrusion (421) pierces into a conductive wire in the first wire groove (411) to form an electric connection, and a lower end of the first connection terminal (42) extends into the connection port (414);

a second connection terminal (43), mounted at the second locking position (413), wherein an upper end of the second connection terminal (43) is provided with a second sharp protrusion (431), the second sharp protrusion (431) pierces into another conductive wire in the first wire groove (411) to form an electric connection, and a lower end of the second connection terminal (43) extends into the connection port (414);

the light source assembly (3) is at least provided with a light-emitting light strip (31) and an electric connection plate (32) electrically connected to the light-emitting light strip (31), wherein the electric connection plate (32) is fixed to the connection port (414) by plug-in connection and forms electric connections with the first connection terminal (42) and the second connection terminal (43), wherein:

an end of each of the first connection terminal (42) and the second connection terminal (43) extending into the connection port (414) is provided with a U-shaped bayonet (422), and the electric connection plate (32) is electrically connected to the U-shaped bayonet (422); and an opening of the lamp holder (1) is elastic, and when the bulb housing (2) is in close connection to the lamp holder (1), the interior of the lamp holder (1) is sealed to prevent water from entering the lamp holder.

2. The LED lamp according to claim 1, wherein an accommodating groove (12) for mounting the intermediate body (41) is formed in a bottom end of the accommodating cavity (11), a positioning column (415) is disposed outside the intermediate body (41), and a first positioning groove (13) mating with the positioning column (415) is formed in a side wall of the accommodating groove (12).

3. The LED lamp according to claim 1, wherein the intermediate body (41) is provided with an annular protrusion (416), and the connection port (414) extends outward and exceeds an outer end surface of the annular protrusion (416).

4. The LED lamp according to claim 1, wherein an annular groove (14) is formed in the side wall of the accommodating cavity (11), and the intermediate body (41) capable of being locked in the annular groove (14) is fixed in the accommodating cavity (11).

5. The LED lamp according to claim 1, wherein the accommodating cavity (11) is provided with a second wire groove (15) for fixing the conductive wire, such that the conductive wire penetrates into the lamp holder (1) from outside.

6. The LED lamp according to claim 1, wherein the electric connection assembly (4) is provided with a sealing cover (44), the sealing cover (44) is provided with a clamping tongue (442) capable of being snap-fitted to the intermediate body (41), the sealing cover (44) is further provided with a pressing strip (441), and the pressing strip (441) extends into the first wire groove (411) to fix the conductive wire in the first wire groove (411).

7. The LED lamp according to claim 1, wherein a first connection part (16) is disposed on the side wall of the accommodating cavity (11), and the bulb housing (2) is provided with a second connection part (21) in limited connection to the first connection part (16).

8. The LED lamp according to claim 1, wherein an end of the first connection terminal (42) extending into the connection port (414) is provided with an elastic contact part (423) and is located on an inner side wall a (45) of the connection port (414); and an end of the second connection terminal (43) extending into the connection port (414) is provided with an elastic contact part (423) and is located on an inner side wall b (46) opposite to the inner side wall a (45) of the connection port (414).

9. The LED lamp according to claim 1, wherein a protruding electronic component (33) is disposed on a plane of the electric connection plate (32), and the protruding electronic component (33) mates with the connection port (414).

* * * * *